Oct. 13, 1959 C. J. GOSSELIN 2,908,299
FUEL TANK VAPOR RECOVERY APPARATUS
Filed Nov. 26, 1956 3 Sheets-Sheet 1
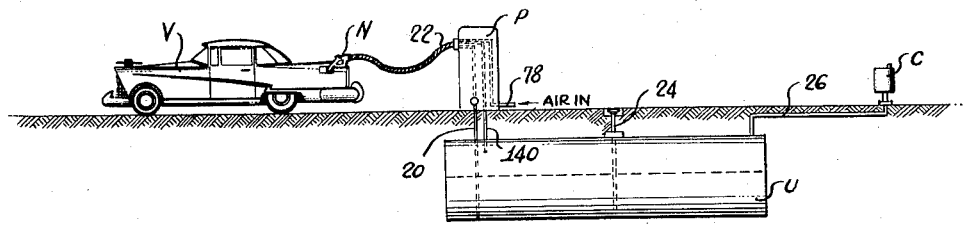
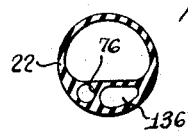
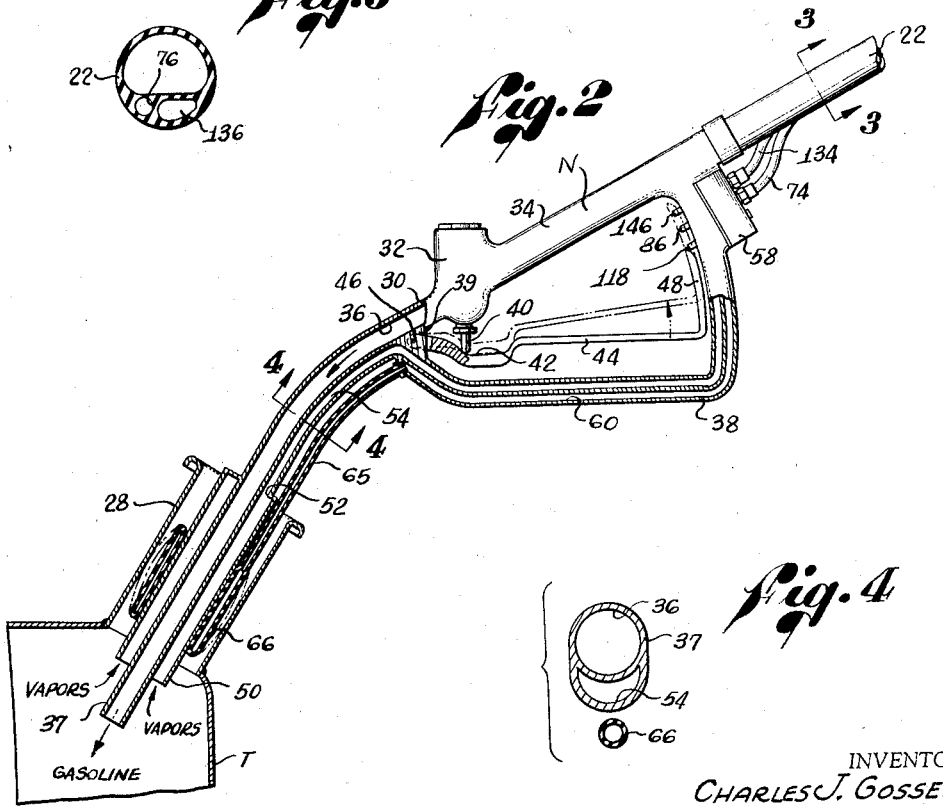
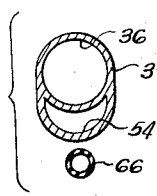
INVENTOR.
CHARLES J. GOSSELIN
BY Fulwider Mattingly & Huntley
Attorneys

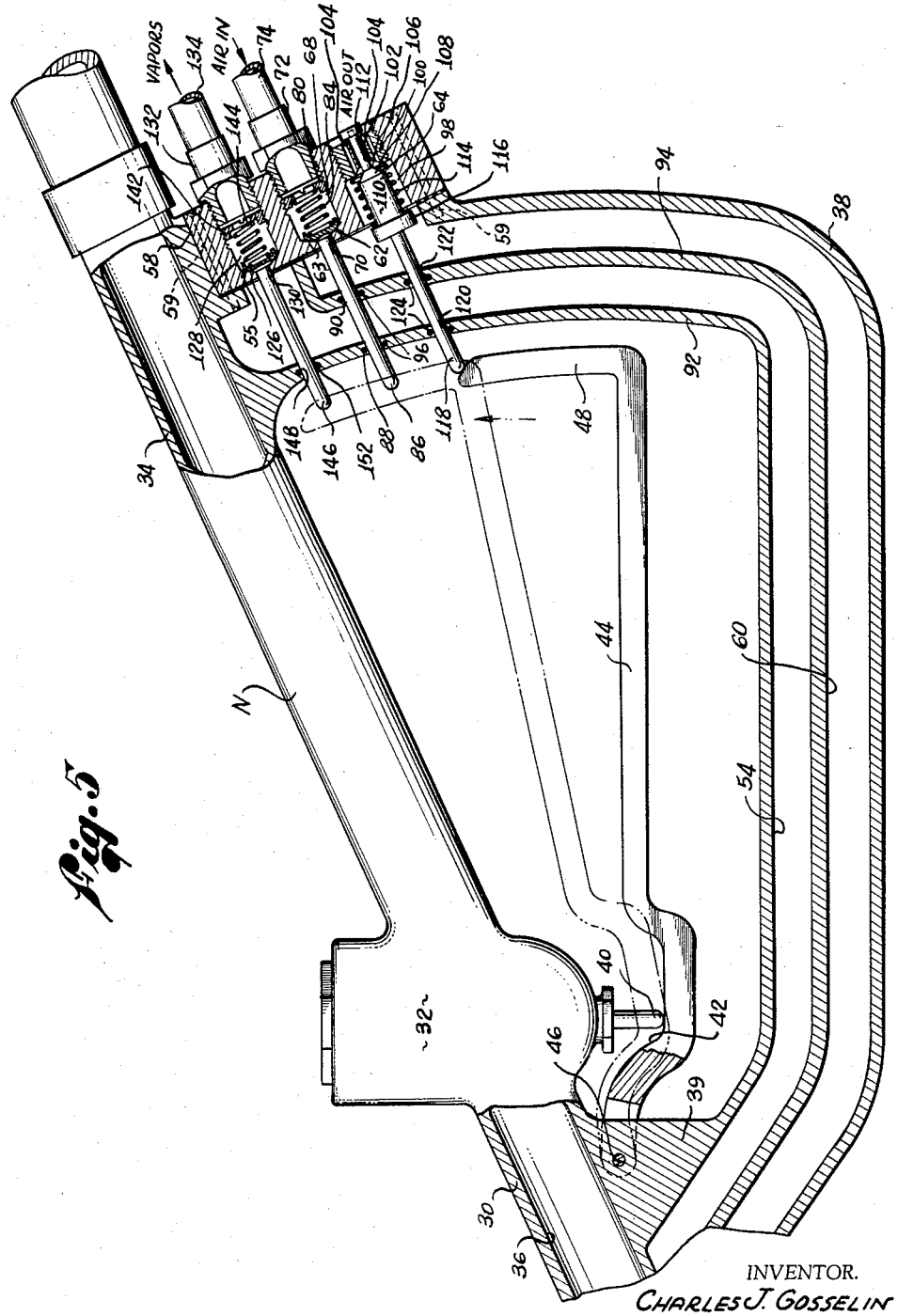

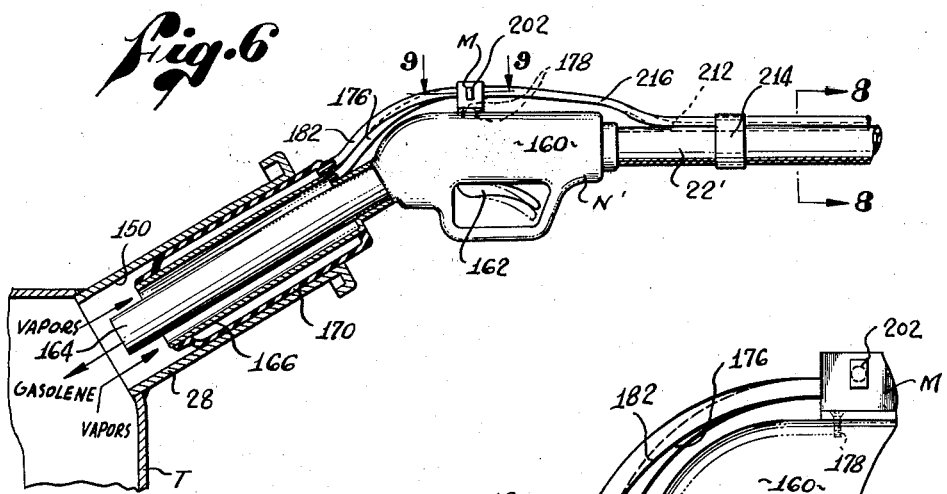
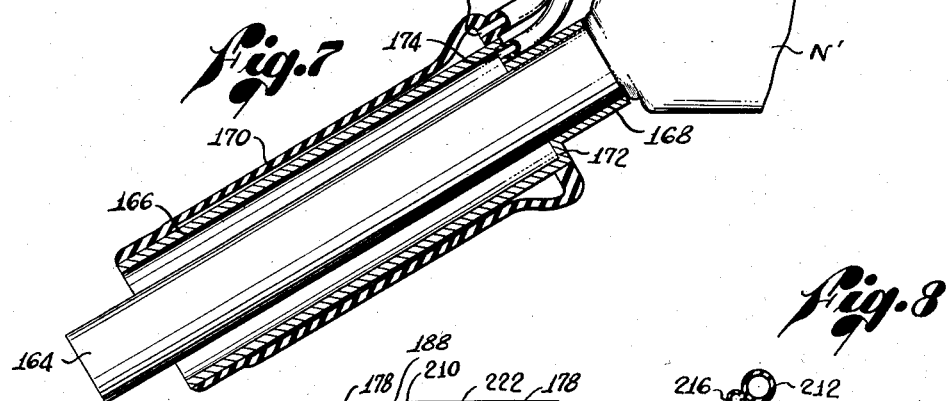
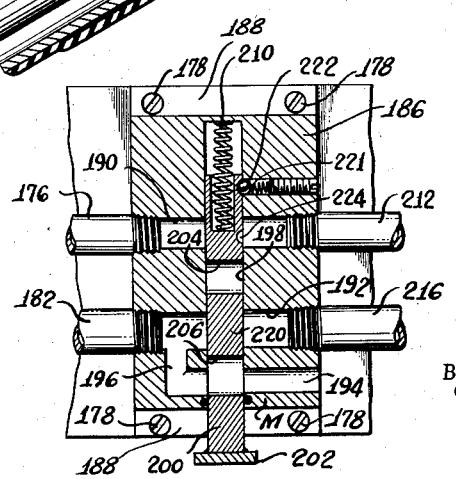

United States Patent Office 2,908,299
Patented Oct. 13, 1959

2,908,299
FUEL TANK VAPOR RECOVERY APPARATUS

Charles J. Gosselin, Long Beach, Calif., assignor of one-half to Martin A. Nishkian, Long Beach, Calif.

Application November 26, 1956, Serial No. 624,386

11 Claims. (Cl. 141—287)

The present invention relates generally to vapor recovery systems and more particularly to novel apparatus for recovering the hydrocarbon vapors displaced from the fuel tank of an automotive vehicle, aircraft and the like, while the tank is being filled.

When the fuel tank of an automotive vehicle, aircraft or the like, is being filled, the hydrocarbon vapors from within the tank are displaced by the rising fuel level into the atomosphere. It has been determined that such hydrocarbon losses contribute appreciably to the air polution existing in and around the principal population centers of the country. It is a major object of the present invention to provide apparatus for recovering the hydrocarbon vapors displaced from such tanks during a filling operation so as to prevent their release into the atmosphere.

It is another object of the invention to provide vapor recovery apparatus of the aforedescribed nature which may be constructed as an integral part of the tank filling system presently employed to fill fuel tanks. Accordingly, the use of this apparatus will not interfere with the normal tank filling operation.

It is a further object to provide vapor recovery apparatus of the aforedescribed nature which is compact in size and light in weight.

An additional object of the invention is to provide vapor recovery apparatus of the aforedescribed nature which is simple in design and rugged of construction whereby it may afford a long and trouble-free service life.

Another object is to provide vapor recovery apparatus which may be readily installed upon existing tank filling systems by a slight modification of such systems.

It is yet another object to provide vapor recovery apparatus of the aforedescribed nature which is positive and fool-proof in operation.

A more particular object is to provide vapor recovery apparatus of the aforedescribed nature utilizing a fill nozzle insertable in the filling neck of a fuel tank and formed with a vapor return passage exposed to the interior of the tank for collecting the hydrocarbons displaced from the tank. The apparatus further includes packing means which seal the annular space between the nozzle and the filling neck during a fueling operation.

These and other objects and advantages of the invention will become apparent from the following detailed description when taken in conjunction with the appended drawings, wherein:

Figure 1 is a side elevational view of a first form of vapor recovery apparatus embodying the present invention;

Figure 2 is an enlarged side view taken partly in central vertical section showing a first form of nozzle member which may be employed with said apparatus;

Figure 3 is a further enlarged sectional view taken on line 3—3 of Figure 2;

Figure 4 is an enlarged sectional view taken on line 4—4 of Figure 2;

Figure 5 is an enlarged fragmentary view of a valving arrangement employed with said nozzle;

Figure 6 is a side view taken partly in central vertical section showing a second form of vapor recovery apparatus embodying the present invention;

Figure 7 is an enlarged fragmentary view showing the front portion of a nozzle utilized with said second form;

Figure 8 is an enlarged sectional view taken on line 8—8 of Figure 7; and

Figure 9 is an enlarged horizontal sectional view taken on line 9—9 of Figure 6.

Referring to the drawings and particularly Figures 1 and 2 thereof, the hydrocarbon vapor recovery apparatus of the present invention is shown in conjunction with a conventional tank filling system of the type found in a retail service station. This system includes an underground storage tank U and a conventional gas pump P arranged above the storage tank U and in communication with the lower portion thereof by a vertically extending withdrawal pipe 20. The upper end of the withdrawal pipe 20 is connected to the intake of the pump P. The discharge of the pump P is connected to one end of a flexible hose 22. The opposite end of the hose 22 is attached to a nozzle N which is shown in detail in Figures 2 and 5. The storage tank U is adapted to be filled by means of the usual fill pipe 24. A vent pipe 26 extends from the upper portion of the storage tank U to a hydrocarbon vapor recovery device C. The latter may be an activated carbon-filled canister of the type shown in my co-pending patent application Serial No. 614,688 filed October 8, 1956, and entitled Interlock for Use With a Vapor Recovery Apparatus, now Patent No. 2,802,492, issued Aug. 13, 1957. As shown in Figure 2, the nozzle N is adapted to be inserted within the filling neck 28 of the fuel tank T of an automotive vehicle V.

More particularly, the nozzle N includes an integral hollow body 30, the mid-portion of which is formed with a conventional fuel valve 32. The upper portion of the body 30 takes the form of an elongated tube 34 that defines a fuel passage 36. The rear end of the tube 34 is connected to the end of the hose 22 so as to receive fuel therefrom. The front portion of the tube 34 curves downwardly so as to define a spout 37 that is readily insertable within the filling neck 28 of the fuel tank T.

The body 30 also includes a downwardly curved guard 38 having its front and rear ends integrally connected to the intermediate and rear portions of the tube 34. The fuel valve 32 controls the flow of fuel through the tube 34, and it includes a downwardly biased plunger 40, the lower end of which abuts a cam surface 42 formed on the front portion of an actuator lever 44. The actuator lever 44 is disposed within the confines of the guard 38 and its front end is pivotally affixed to a web 39 formed on the lower intermediate portion of the body 30 by a pin 46. The rear portion of the actuator lever 44 is formed with a generally upwardly extending finger 48. When the actuator lever 44 is disposed in its solid outline position of Figures 2 and 5, the fuel valve 32 will be maintained in a closed position so as to block the flow of fuel through the tube 34. When the actuating lever is pivoted to its dotted outline position of Figures 2 and 5, however, fuel will be permitted to flow from the hose 22 through the tube 34 into the fuel tank T.

The spout 37 is integrally formed with a generally cylindrical vapor collection cylinder 50. The front end of this cylinder 50 is open, while the rear end thereof is closed except for a port 52. This port 52 is in communication with the front end of a vapor recovery duct 54 formed along the underside of the front portion of the tube 34 and through the inner portion of the guard 38. The rear of the vapor recovery duct 54 is in communication with a vapor escape valve 55. The outer portion of the guard 38 is also formed with an air duct 60. This air duct 60 is in communication at its rear end with an inlet valve 62 and an outlet valve 64, both formed in a block 58 secured to the upper rear portion of the handle 38 by bolts 59. The front end of the portion of the air duct 60 defined by the guard 38 terminates in a flexible conduit 65. The front end of this conduit 65 is in communication with a sleeve-like elastic packing element 66 having its inner periphery affixed to the outer surface of the vapor collection cylinder 50.

Referring now to Figure 5, the air inlet valve 62 is of the poppet type and includes a head 63 disposed within a cylindrical cavity 68 formed in the block 58. The front portion of this cavity 68 merges into a coaxial bore 70 of smaller diameter. The rear portion of the cavity 68 is threaded to receive a complementary fitting 72 of a short length of air conduit 74. The opposite end of this air conduit 74 is attached to the hose 22 and is in communication with an air passage 76 that is integrally formed through the length of the hose, as indicated in Figure 3. The end of the air passage 76 adjacent the pump P is connected to a pipe 78 that is attached to a source of compressed air (not shown). An externally threaded ring 80 is disposed in the cavity 68 forwardly of the fitting 72. The front end of the cavity 68 is of frusto-conical configuration and the head 63 of the air inlet valve 62 is constantly biased into seating engagement therewith by a coil compression spring 84, the latter being interposed between the head 63 and the ring 80. The stem 86 of the air inlet valve 62 is integral with the head 63 and slidably extends through aligned bores 88 and 90 formed in the guard walls 92 and 94. Suitable sealing rings 96 are provided in these walls for engagement with the valve stem 86.

The air outlet valve 64 is disposed in a second annular cavity 98 formed in block 58 below the cavity 68. The rear portion of this cavity 98 is threaded to receive a plug 100 formed with a coaxial bore 102. A plurality of axial ports 104 surround this bore 102. The inner portion of the plug 100 is formed with a frustro-conical seat 106 upon which is adapted to seat a complementary surface 108 formed on a cylindrical blocking element 110 of the air inlet valve 63. The blocking element 110 is formed with a coaxial pin 112 that slidably extends through the bore 102 of the plug 100. A coil compression spring 114 interposed between the plug 100 and the head 116 of the blocking element 110 constantly biases the surface 108 away from seating engagement with the plug's seat 106. The stem 118 of the air outlet valve 64 is integral with the blocking element 110 and extends through aligned bores 120 and 122 formed in the guard walls 92 and 94. Suitable sealing rings 124 are provided in these walls for engagement with the valve stem 118.

With further reference to Figure 5, the vapor escape valve 55 is also of the poppet type and includes a head 126 disposed within a cylindrical cavity 128 formed in the upper portion of the block 58. The front of this cavity 128 merges into a coaxial bore 130 of smaller diameter. The rear portion of the cavity 128 is threaded to receive a complementary fitting 132 of a short length of conduit 134. The opposite end of this conduit 134 is attached to the hose 22 adjacent the nozzle N and is in communication with a longitudinally extending vapor passage 136 that is integrally formed through the length of the hose, as indicated in Figure 3. The end of the vapor passage 136 adjacent the pump P is connected to a vertically extending discharge pipe 140 that extends downwardly into the upper portion of the storage tank U. An externally threaded ring 142 is disposed in the cavity 128 forwardly of the fitting 132. The front end of the cavity 128 is of frusto-conical configuration and the head 126 of the vapor escape valve 55 is constantly biased into seating engagement therewith by a coiled compression spring 144, the latter being interposed between the head 126 and the ring 142. The stem 146 of the vapor escape valve 55 is integral with the head 126 and slidably extends through a bore 148 formed in the inner guard wall 92. A suitable sealing ring 152 is provided in this wall for engagement with the valve stem 146.

As will be clear from Figure 5, the vapor escape valve 55 and the air inlet valve 62 are normally biased into a closed position by their respective springs 144 and 84. The air outlet valve 64 on the other hand is normally biased into an open position by its spring 114. The front ends of the stems 146, 86 and 118 of these valves are disposed in the path of the finger 48 of the actuator lever 44. Accordingly, upon upward movement of the actuator lever 44 to its dotted outline position of Figure 5, each of these stems will be cammed rearwardly by virtue of their engagement with finger 48. Rearward movement of the stem 118 of the air outlet valve 64 will cause the surface 108 of the blocking element 110 to be seated against the seat 106 of the plug 100. Rearward movement of the stem 86 of the air inlet valve 62 will cause its head 63 to be lifted off its frusto-conical seat formed in the front of the cavity 68. Similarly the head 126 of the vapor escape valve 55 will be lifted rearwardly off its frusto-conical seat formed in the front of the cavity 128. Upon return of the actuator lever 44 to its original position shown in solid outline in Figures 2 and 5, the finger 48 will be lowered out of contact with the valve stems and the vapor escape valve 55 and the air inlet valve 62 will be automatically closed, while the air outlet valve 64 is automatically reopened.

In the operation of the aforedescribed first form of apparatus, the front portion of the body 30 of the nozzle N is inserted within the filling neck 28 of the fuel tank T. At this time the air outlet valve 62 will be in an open position and the packing element 66 will be in its collapsed position shown in solid outline in Figure 2. When the operator raises the actuator lever 44 from its solid to its dotted outline position of Figures 2 and 5, the air outlet valve 64 will first be closed. Thereafter, the air inlet valve 62 will be opened and the vapor escape valve 55 will likewise be opened. Upon movement of the air inlet valve 62 to its open position, compressed air will flow through the air duct 60 and conduit 65 into the packing element 66 so as to expand the latter to its dotted outline position of Figure 2. In its expanded position, the packing element 66 will seal off the annulus 150 between the outer periphery of the vapor collection cylinder 50 and the inner periphery of the filling neck 28. Upward movement of the actuator level 44 will also cause its cam surface 42 to urge the plunger 40 of the fuel valve 32 upwardly. This will move the parts of the fuel valve 32 to an open position so as to permit fuel to flow through the nozzle tube 34 and spout 37 into the tank T. The hydrocarbon vapors and air displaced from the upper portion of the tank T will be positively restrained from flowing outwardly into the atmosphere through the filling neck 28 by the expanded packing element 66. Instead, as indicated in Figure 2, these vapors will enter the open front end of the vapor collection cylinder 50 and pass rearwardly and upwardly through the vapor recovery duct 54. From the rear end of the vapor recovery duct 54, these vapors will pass through the open vapor escape valve 55 and conduit 134 into the vapor passage 136 formed in the hose 22. From this point, the mixture of hydrocarbon vapor and air will pass downwardly through the discharge pipe 140 into the upper portion of the underground storage tank U. At the conclusion of the fueling operation, the actuator lever 44 will be returned to its original position by the downwardly-biased plunger 40 of the fuel valve 32. Such movement will effect automatic closing of the vapor escape valve 50 and the air inlet valve 62, while effecting re-opening of the air outlet valve 64. Accordingly, the packing element 66 will retract to its original collapsed position, the air contained therewithin escaping through the air outlet valve 64.

Referring now to Figures 6, 7, and 8, there is shown a second form of vapor recovery apparatus embodying the present invention. This second form of apparatus is adapted to be readily installed upon the existing tank filling system of a conventional retail service station. It employs an underground storage tank U and pump P similar to that described hereinabove in conjunction with the first form of apparatus. This second form of apparatus, however, utilizes a nozzle N' and hose 22' of conventional construction which are modified in the manner described hereinafter. A fuel valve (not shown) is positioned within the body 160 of the nozzle N'. This fuel valve is normally closed when the actuating lever 162 of the nozzle N' is disposed in its lowered position shown in dotted outline in Figure 6. When the actuating lever 162, however, is raised to its solid outline position of this figure, the fuel valve opens so as to permit fuel to be delivered through the nozzle's spout 164 into the filling neck 28 of the fuel tank T.

A vapor collection cylinder 166 of larger diameter than the spout 164 encompasses the latter, the rear portion of this vapor collection cylinder being formed by a collar 168 that is telescopically received by the portion of the spout adjacent the body 160. The collar 168 is rigidly affixed to the spout 164 as by welding. A sleeve-like elastic packing element 170 has its front and rear portions affixed to the front and rear portions of the vapor collection cylinder 166. The radially extending wall 172 that interconnects the rear end of the vapor collection cylinder 166 with the front of the collar 168 is formed with a port 174. This port 174 receives the front end of a short flexible conduit 176. The rear end of this conduit 176 is connected to the front of a manually operable valve M mounted on the upper portion of the nozzle N' by bolts 178. As shown clearly in Figure 7, the rear end of the packing element 170 is formed with an aperture 180. This aperture 180 receives the front end of a second short flexible conduit 182. The rear end of this second short flexible conduit 182 is connected to the front of the valve M.

With reference to Figure 9, the valve M includes a body 186, the sides of which are formed with flanges 188 through which extend the bolts 178. The body 186 is formed with a vapor passage 190, an air inlet passage 192 and an air outlet passage 194. These three passages are parallel. A short by-pass passage 196 interconnects the front ends of the air inlet and air outlet passages 192 and 194, respectively. The body 186 is also formed with a passage 198 normal to the passages 190, 192 and 194 that slidably receives a slider element 200. The major portion of the slider 200 is disposed within the confines of the passage 198 with a manually engageable button 202 formed on the exposed portion thereof. The intermediate portion of the slider 200 is formed with a vapor escape port 204 and an air port 206. The end of the slider receiving passage 198 opposite the slider's exposed end is closed. A coil compression spring 210 is interposed between this closed end and the adjacent side of the slider 200. With this arrangement, the spring 210 normally biases the slider to its position of Figure 9.

The rear end of the vapor passage 190 is connected to the front of a vapor conduit 212. This vapor conduit 212 is affixed to the hose 22' by means of several clamps 214 (only one of which is shown). The end of the vapor conduit 212 remote from the nozzle N' is connected to a vapor collection chamber, such as the upper portion of the underground storage tank, in a manner similar to that described hereinbefore in conjunction with the first form of the apparatus. The rear end of the air inlet passage 192 is connected to the front end of an air hose 216. This air hose 216 is affixed to the hose 22' by the clamps 214. The end of the air supply hose 216 opposite the nozzle end is connected to a source of compressed air (not shown).

In the operation of this second form of apparatus, the spout 164 of the nozzle N' is inserted within the filling neck 28 of the fuel tank T. At this time, the valve M will have its parts arranged in the position shown in Figure 9. Referring thereto the interior of the packing element 170 will be in communication with the atmosphere by means of the conduit 182, the by-pass passage 196 and the air outlet passage 194. Accordingly, the packing element 170 will be disposed in its collapsed position of Figure 7. It will be noted that the section 220 of the slider 200 between the vapor escape port 204 and the air escape port 206 blocks the vapor passage 195. The operator next urges the slider 200 towards the closed end of the slider passage 198 relative to its position of Figure 9 until the vapor escape port 204 is aligned with the vapor escape passage 190 and the air port 206 is aligned with the air passage 192. This movement of the slider will position its section 220 athwart the air outlet passage 194. The interior of the vapor collection cylinder 166 will then be in communication with the underground storage tank by means of the conduit 176, the vapor passage 190 and the conduit 212. Simultaneously, the interior of the packing element 170 will be placed in communication with the source of compressed air by means of the air conduits 182 and 216 and the air passage 192. Thus, the packing element 170 will be inflated, as indicated in Figure 6. The actuator lever 162 may then be moved to its solid outline position of Figure 6 so as to admit fuel into the tank T through the spout 164. During such flow of fuel into the tank, the packing element 170 will positively seal off the annulus 150 between the outer periphery of the vapor collection cylinder 166 and the inner periphery of the filling neck 28. The hydrocarbon vapors and air displaced from the upper portion of the tank T will therefore be blocked against flowing outwardly into the atmosphere through the filling neck 28 and instead will enter the open front end of the vapor collection cylinder 166 and pass rearwardly through the vapor escape conduits 176 and 212. At the conclusion of the tank filling operation, the operator will return the slider 200 and the actuator lever 162 to their original positions. The packing element 166 will in this manner be deflated and the nozzle N' may be removed from the filling neck 28. Conveniently, the valve M will be provided with a spring-urged ball detent 221 that cooperates with spaced recesses 222 and 224 to retain the slider 200 in either of its two positions.

From the foregoing description it will be apparent that the present invention provides vapor recovery apparatus which positively prevents the release of contaminants into the atmosphere during a tank filling operation. Moreover, this apparatus is simple of construction and foolproof in operation and readily lends itself to incorporation in conventional tank filling systems.

Various modifications and changes may be made with regard to the foregoing description without departing from the spirit of the invention or the scope of the following claims.

I claim:

1. Apparatus useable with a vapor collection chamber and a source of compressed air for recovering the vapors displaced from the filling neck of a tank as the latter is filled with a liquid, comprising: a nozzle having a spout member on its front end that is freely insertable within said filling neck; a vapor collection cylinder member on the front portion of said nozzle and having an open front end; a normally collapsed inflatable packer mounted on one of said members; a vapor return conduit in communication with said cylinder member; an air conduit in communication with said packer; and valve means on said nozzle that connect said vapor return conduit to said vapor collection chamber and said air conduit to said source of compressed air.

2. Apparatus useable with a vapor collection chamber and a source of compressed air for recovering the vapors displaced from the filling neck of a tank as the latter is filled with a liquid, comprising: a nozzle having a spout on its front end that is freely insertable within said filling neck; a vapor collection cylinder encircling said spout and having an open front end; a normally collapsed inflatable packer mounted on said cylinder; a vapor return conduit in communication with said cylinder; an air conduit in communication with said packer; and valve means on said nozzle that concurrently connect said vapor return conduit to said vapor collection chamber and said air conduit to said source of compressed air.

3. Apparatus useable with a vapor collection chamber and a source of compressed air for recovering the vapors displaced from the filling neck of a tank as the latter is filled with a liquid, comprising: a nozzle having a spout member on its front end that is insertable within said filling neck, said nozzle also having a fuel valve and an actuator lever for said fuel valve; a vapor collection cylinder member on said nozzle and having an open front end; a normally collapsed inflatable packer mounted on one of said members; a vapor return conduit in communication with said cylinder member; an air conduit in communication with the interior of said packer; valve means that when actuated connect said vapor return conduit to said vapor collection chamber and said air conduit to said source of compressed air; and means operatively interconnecting said actuator lever and said valve means for concurrent operation whereby movement of said actuator lever in a direction to open said fuel valve will actuate said valve means.

4. Apparatus useable wtih a vapor collection chamber and a source of compressed air for recovering the vapors displaced from the filling neck of a tank as the latter is filled with fuel, comprising: a nozzle having a spout on is front and that is insertable wtihin said filling neck, said nozzle also having a fuel valve and an actuator lever for said fuel valve; a vapor collection cylinder on said nozzle encircling said spout and having an open front end; a normally collapsed inflatable packer sleeve mounted on said cylinder; a vapor return conduit in communication with said cylinder; an air conduit in communication with the interior of said packer sleeve; valve means that when actuated connect said vapor return conduit to said vapor collection chamber and said air conduit to said source of compressed air; and means operatively interconnecting said actuator lever and said valve means for concurrent operation whereby movement of said actuator lever in a direction to open said fuel valve will actuate said valve means.

5. Apparatus useable with a vapor collection chamber and a source of compressed air for recovering the vapors displaced from the filling neck of a tank as the latter is filled with fuel, comprising: a nozzle having a spout on its front end that is insertable within said filling neck, said nozzle also having a normally closed fuel valve and an actuator lever therefor which is normally maintained in a first position and which when moved to a second position will effect the opening of said fuel valve; a vapor collection cylinder member carried by said nozzle and having an open front end; a normally collapsed inflatable packer mounted on one of said members; a vapor return conduit in communication with said vapor collection cylinder member; an air conduit in communication with the interior of said packer, said air conduit normally being in communication with the atmosphere; and valve means that when actuated concurrently connect said vapor return conduit to said vapor collection chamber and said air conduit to said source of compressed air while blocking communication of said air conduit with the atmosphere, said valve means having actuating elements disposed in the path followed by said actuating lever so as to be engaged by the latter as it moves between its first and second positions.

6. Apparatus useable with a vapor collection chamber and a source of compressed air for recovering the vapors displaced from the filling neck of a tank as the latter is filled with fuel, comprising: a nozzle having a spout on its front end that is insertable within said filling neck, said nozzle also having a normally closed fuel valve and an actuator lever therefor which is normally maintained in a first position and which when moved to a second position will effect the opening of said fuel valve; a vapor collection cylinder on said nozzle encircling said spout and having an open front end; a normally collapsed inflatable packer sleeve mounted on said cylinder; a vapor return conduit in communication with said cylinder; an air conduit in communication with the interior of said packer sleeve, said air conduit normally being in communication with the atmosphere; and valve means that when actuated concurrently connect said vapor return conduit to said vapor collection chamber and said air conduit to said source of compressed air while blocking communication of said air conduit with the atmosphere, said valve means having actuating elements disposed in the path followed by said actuating lever so as to be engaged by the latter as it moves between its first and second positions.

7. Apparatus for recovering the vapors displaced from the filling neck of a tank as the latter is filled with fuel, comprising: a nozzle having a spout on its front end that is insertable within said filling neck, said nozzle also having a normally closed fuel valve and an actuator lever therefor which is normally maintained in a first position and which when moved to a second position will effect the opening of said fuel valve; a guard on said nozzle, said actuator lever being disposed within the confines of said guard; a vapor collection cylinder member carried by the front portion of said nozzle and having an open front end; a normally collapsed inflatable packer mounted on one of said members; vapor return passage means in communication with said cylinder member and including a passageway extending through said guard; an air conduit in communication with the interior of said packer and including a second passageway extending through said guard; a normally closed vapor escape value on said nozzle controlling the flow of vapor through said passageway; a normally closed air inlet valve on said nozzle adjacent said vapor escape valve; a normally open air outlet valve on said nozzle adjacent said air inlet valve normally connecting said second passageway with the atmosphere; and actuating elements on said valves disposed in the path followed by said actuating lever whereby movement of said lever from its first to its second position will effect the opening of said vapor escape and air inlet valves and the concurrent closing of said air outlet valve.

8. Apparatus for recovering the vapors displaced from the filling neck of a tank as the latter is filled with fuel, comprising: a nozzle having a spout on its front end that is insertable within said filling neck, said nozzle also having a normally closed fuel valve and an actuator lever therefor which is normally maintained in a first position and which when moved to a second position will effect the opening of said fuel valve; a guard on said nozzle, said actuator lever being disposed within the confines of said guard; a vapor collection cylinder on said nozzle encircling said spout and having an open front end; a normally collapsed inflatable packer sleeve mounted on said cylinder; vapor return passage means in communication with said cylinder and including a passageway extending through said guard; an air conduit in communication with the interior of said packer sleeve and including a second passageway extending through said guard; a normally closed vapor escape valve on said nozzle and controlling the flow of vapor through said passageway; a normally closed air outlet valve on said nozzle adjacent said vapor escape valve; a normally open air outlet valve on said nozzle adjacent said air inlet valve normally connecting said second passageway with the atmosphere; and actuating elements on said valves disposed in the path followed by said actuating lever whereby movement of said lever from its first to its second position will effect the opening of said vapor escape and air inlet valves and the concurrent closing of said air outlet valve.

9. Apparatus for recovering the vapors displaced from the filling neck of a tank as the latter is filled with fuel, comprising: a nozzle having a spout on its front end that is insertable within said filling neck, said nozzle also having a normally closed fuel valve; an actuator lever for said fuel valve, said lever normally being maintained in a first position and when moved to a second position will effect the opening of said fuel valve; a finger on said actuating lever; a guard on said nozzle, said actuator lever being disposed within the confines of said guard; a vapor collection cylinder carried by the front portion of said nozzle and having an open front end; a normally collapsed inflatable packer mounted on said cylinder; vapor return passage means in communication with said cylinder and including a passageway extending through said guard; an air conduit in communication with the interior of said packer and including a second passageway extending through said guard; a normally closed vapor escape valve on said nozzle controlling the flow of vapor through said passageway; a normally closed air outlet valve on said nozzle adjacent said vapor escape valve; a normally open air outlet valve on said nozzle adjacent said air inlet valve for normally connecting said second passageway with the atmosphere; and stem elements on said valves disposed in the path followed by said finger, engagement of said stems by said finger effecting the opening of said vapor escape and air inlet valves and the concurrent closing of said air outlet valve.

10. Apparatus useable with a vapor collection chamber and a source of compressed air for recovering the vapors displaced from the filling neck of a tank as the latter is filled with a liquid, comprising: a nozzle having a spout on its front end that is insertable within said filling neck; a vapor collection cylinder member on said nozzle and having an open front end; a normally collapsed inflatable packer mounted on one of said members; a vapor return conduit connecting said cylinder member with said vapor collection chamber; an air conduit connecting the interior of said packer with said source of compressed air; a manually operable valve carried by said nozzle, said valve being formed with a vapor passage defining a portion of said vapor return conduit, said valve also being formed with an air inlet defining a portion of said air conduit, said valve additionally being formed with an air outlet passage in communication with said air inlet passage and normally connecting it with the atmosphere; and a control member in said valve which blocks said vapor passage and said air inlet passage in its first position, said control member being movable to a second position wherein it permits flow through said vapor passage and said air inlet passage while blocking flow through said air outlet passage.

11. Apparatus useable with a vapor collection chamber and a source of compressed air for recovering the vapors displaced from the filling neck of a tank as the latter is filled with a liquid, comprising: a nozzle having a spout on its front end that is insertable within said filling neck; a vapor collection cylinder on said nozzle encircling said spout having an open front end; a normally collapsed inflatable packer sleeve mounted on said cylinder; a vapor return conduit connecting said cylinder with said vapor collection chamber; an air conduit connecting the interior of said packer with said source of compressed air; a manually operable valve carried by said nozzle, said valve being formed with a vapor passage defining a portion of said vapor return conduit, said valve also being formed with an air inlet defining a portion of said air conduit, said valve additionally being formed with an air outlet passage in communication with said air inlet passage and normally connecting it with the atmosphere; and a control member in said valve which blocks said vapor passage and said air inlet passage in its first position, said control member being movable to a second position wherein it permits flow through said vapor passage and said air inlet passage while blocking flow through said air outlet passage.

References Cited in the file of this patent

UNITED STATES PATENTS

| 424,259 | Bernan | Mar. 25, 1890 |
| 1,325,991 | King | Dec. 23, 1919 |
| 1,506,418 | Evensta et al. | Aug. 26, 1924 |
| 1,893,979 | Barrere | Jan. 10, 1933 |
| 2,056,828 | Clawson | Oct. 6, 1936 |
| 2,299,116 | Svirsky | Oct. 20, 1942 |
| 2,326,415 | Titus | Aug. 10, 1943 |